United States Patent [19]
Deconinck

[11] 3,838,923
[45] Oct. 1, 1974

[54] REPROGRAPHIC CAMERA

[75] Inventor: Hugo Frans Deconinck, Deurne-Zuid, Belgium

[73] Assignee: AGFA-Gevaert N.V., Mortsel, Belgium

[22] Filed: Oct. 6, 1972

[21] Appl. No.: 295,579

[30] Foreign Application Priority Data
Oct. 7, 1971  Belgium................................ 346471

[52] U.S. Cl..................... 355/18, 354/233, 354/241
[51] Int. Cl. ............................................ G03b 27/32
[58] Field of Search .. 95/53 E, 53 EA, 12.5, 31 EL, 95/57 R; 355/18; 354/233, 241

[56] References Cited
UNITED STATES PATENTS

| | | | |
|---|---|---|---|
| 1,413,187 | 4/1922 | Paumier................................ | 95/12.5 |
| 2,371,592 | 3/1945 | Gorey et al. ......................... | 95/12.5 |
| 2,996,952 | 8/1961 | Orlando............................... | 95/57 X |
| 3,065,387 | 11/1962 | Dean............................ | 95/53 EA X |
| 3,252,318 | 5/1966 | Rosen............................... | 45/53 E X |
| 3,379,108 | 4/1968 | Beyer et al. ........................ | 95/31 CA |
| 3,500,733 | 3/1970 | Kreuz et al. .......................... | 95/12.5 |
| 3,520,391 | 7/1970 | Graham et al..................... | 95/53 EA |
| 3,673,942 | 7/1972 | Lingley...................................... | 95/57 |
| 3,696,727 | 10/1972 | Yokozato............................. | 95/53 E |
| 3,712,191 | 1/1973 | Nobusawa......................... | 95/53 EA |

*Primary Examiner*—Samuel S. Matthews
*Assistant Examiner*—E. M. O'Connor
*Attorney, Agent, or Firm*—William J. Daniel

[57] ABSTRACT

A reprographic camera has housed in its belows a remote controlled blind type shutter, so that the photographic material can be masked from day light when the camera is not in use to avoid fog formation in the material. The flexible blind has an exposure aperture suspended between two rollers which are driven by a motor. An AC circuit is connected to said motor during movement of said blind to its open position and a DC circuit is connected to said motor to maintain said blind in its open position.

4 Claims, 7 Drawing Figures

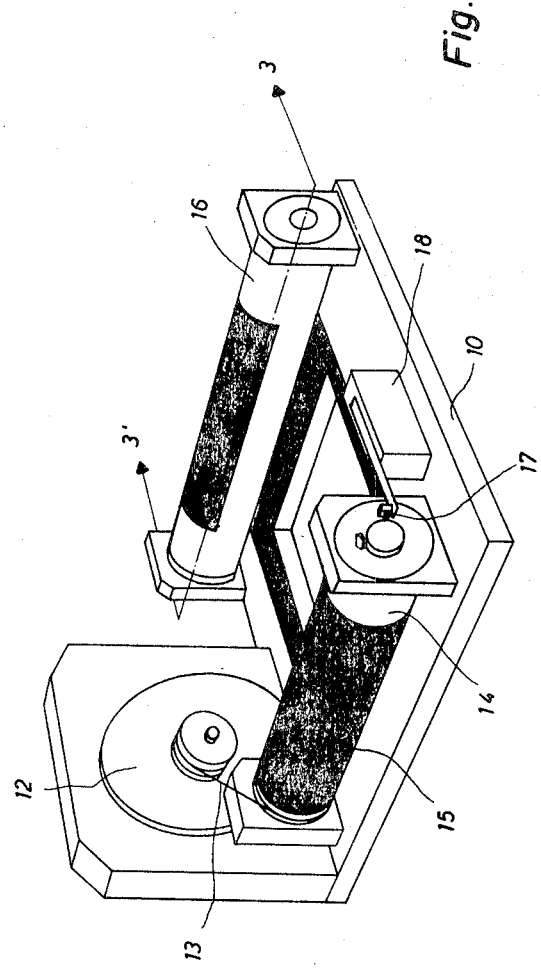

REPROGRAPHIC CAMERA

The present invention relates to a compact camera for use in the reprographic field which camera is intended for the exposure of a photographic material to a sheet original. More particularly, the invention relates to a blind type shutter positioned in the bellows between the optical system and the image plane of the camera.

It is known that the exposure time of compact reprographic cameras is defined by the time during which one or more exposure lamps are energized. This method involves that the ambient light reaches the image plane through the optical system during the inactive periods of the camera. In case photographic sheet material is used this method has no drawbacks, since after exposure the photographic material is removed from the camera in order to be submitted to the required chemical treatments. The up-to-date compact reprographic cameras, however, can be provided with a cassette containing a photographic material roll. This cassette fitting implies the feeding of an unexposed further strip of said photographic material to the image plane of the camera by means of adapted mechanical means after a foregoing strip of such material has been exposed image-wise. Consequently, the intermittent use of the camera produces the unwanted phenomenon that the photographic material is exposed, during the inactive period of the camera to ambient light which strikes the image plane through the optical system thus giving rise to fog formation.

For the purpose of limiting as much as possible the loss of photographic material due to undesired blackening, either the optical system can be covered by a light-tight hood during its inactive period or the complete device can be housed in a dark room provided with a light source having a spectral range to which the photographic material is insensitive. The first method is but little practical, whereas the second one requires an additional expense. The small sizable bellows of the present compact reprographic cameras do also not permit the incorporation of a mechanism which is applied in large size precision cameras for graphic purposes and which comprises means for screening the optical system with a lug positioned in the bellows.

The object of the present invention is to provide a cheap and simple closure mechanism to be fitted in the camera bellows to shut light from the bellows.

The reprographic camera for exposing a sheet of photographic material to an original comprises a holder for positioning the sheet-like original in the object plane of the camera, an optical projection system provided with a lens fitted to a plate and bellows constituting a light-tight housing between the plate and the image plane of the camera, intended for projecting the image of the original into the image plane of the camera, a cassette arranged to contain a roll of photographic material and to unwind said material in sheet portions and to position said sheets in the image plane of the camera, light means for illuminating the holder with sheet material, a blind type closure which is provided at the inside of the lens holding plate and which is opened and closed by electric motor means, and a current control means for controlling said electric motor means.

The invention will be described hereinafter by way of some embodiments with reference to the annexed drawings in which:

FIG. 2 is a perspective view of the blind-type closure according to a preferred embodiment.

Figure 1:
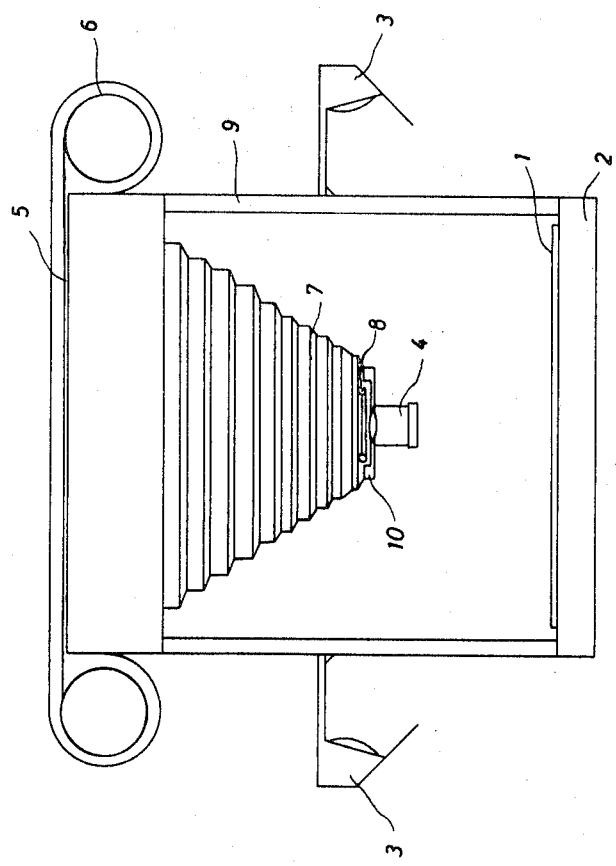
FIG. 1 is a diagrammatic illustration of the construction of the compact reprographic camera.

Although FIG. 1 illustrates a vertical camera provided with an optical system comprising a lens which is positioned in an appropriate holder, such type of camera is not a determinant feature for the present invention and the instant closure mechanism may also be applied in horizontal cameras and may be used for other optical systems comprising, for example prism and mirror optics.

According to FIG. 1 the original 1 to be reproduced is placed on the support 2 and is uniformly illuminated by the lamp set 3. Through an optical system comprising a lens mounted on a plate 10 the image of the original is projected on the image plane where the sheet 5 of photographic material is located, said photographic roll material being contained as a roll in a cassette 6. The flexible bellows 7 combined with a shutter 8 protect the photographic material against the penetration of ambient light. The whole unit is supported by the frame 9.

Figure 6:
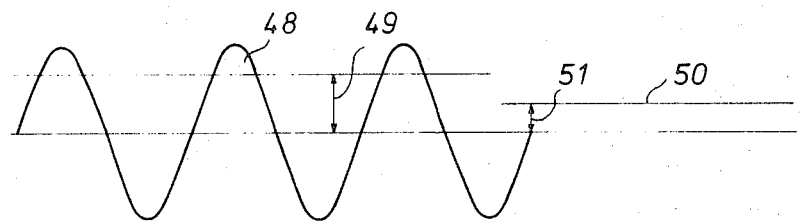
FIG. 6 is a graphical representation of the current through the rotor of the motor driving the closure and FIG. 7 shows another embodiment of the closure mechanism according to the invention.

A perspective view of the instant closure is illustrated in FIG. 2. The whole mechanism is mounted on the lens holding plate 10 and consists of a self-starting synchronous motor 12, a driven roller 14, a non driven roller 16, a microswitch 18 and a belt 15 of elastic light-tight material provided with an opening, said belt travelling on the rollers 14 and 16. When the synchronous motor 12 is energized by an alternating voltage, a string 13 transmits the rotational movement to the driven roller 14 causing the beltlike blind 15 to unwind from the non driven roller 16. A small screw 17 fitted to the extended portion of the shaft of one of the rollers (in the present embodiment the driven roller, see FIG. 2) switches over the microswitch 18 at the moment the opening in the blind 15 coincides with the opening of plate 10. At that moment, a small D.C. voltage is applied to the synchronous motor, causing it to halt. However, since the motor stays energized, no reverse rotation occurs and the rotor remains in its last position. Preferably the D.C. current, flowing through the rotor coils, is less than the RMS value which flows during the rotation of the motor rotor. In FIG. 6, a graphical representation of both currents is given. Here, 48 denotes the sinusoidal path of the A.C. current during rotation of the motor, which corresponds with a RMS value represented by 49. The D.C. current 50, having a value 51, is that which is sent through the motor during stopage, corresponding with the time lapse during which the closure is opened. The opening time of the closure may be controlled by the same time switch or relay controlling the illumination time of the lamps. Closing of the blind, after the set time, is effected by a spring built inside the non-driven roller 16 (see FIG. 3).

Figure 3:
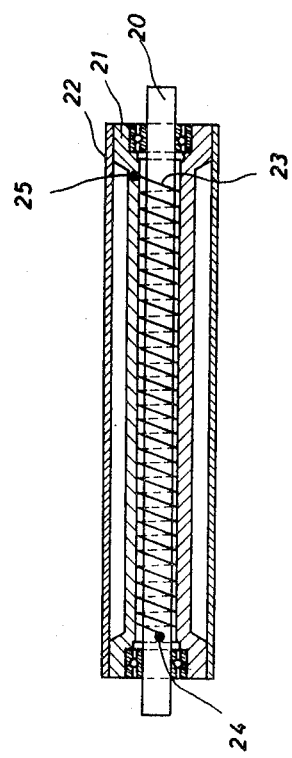
FIG. 3 is a sectional view on the line 3-3' of FIG. 2

A section of roller 16 on line 3-3' of FIG. 2 is illustrated in FIG. 3. A stationary shaft 20 bears a hollow cylinder formed by the concentric sheaths 21 and 22. In the space between the sheath 21 and the shaft 20 a torsion spring 23 is fitted. The extremities of this spring engage the shaft 20 and the cylinder sheath 21, in points 24 and 25 respectively. When the closure opens, the spring 23 is tensioned by the pulling force of the blind on the roller 16. When the motor is de-energized, the resilient power of the spring suffices to make the non driven roller return to its inactive position, preventing light from entering the bellows.

Figure 4:
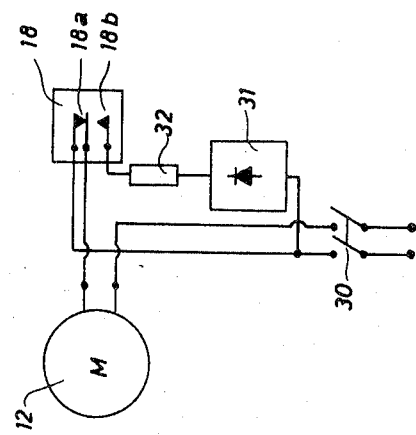
FIG. 4 is a diagrammatic illustration of the electric circuit which controls the shutter.

The diagram of the alternating voltage and direct voltage circuit for energizing the self-starting synchronous motor is illustrated in FIG. 4. When the switch 30 closes, an alternating voltage is fed to the motor 12 through the normally closed contact 18a of the microswitch 18. When the shutter is opening and the pole of microswitch 18 is changed by abutment of the small screw 17 against its lever, so that the contact 18b is closing, the direct current circuit comprising the rectifier 31, the resistance 32 and the contact 18b is closed, stopping the motor. Consequently the position of the synchronous motor is held without further rotation.

Figure 5:
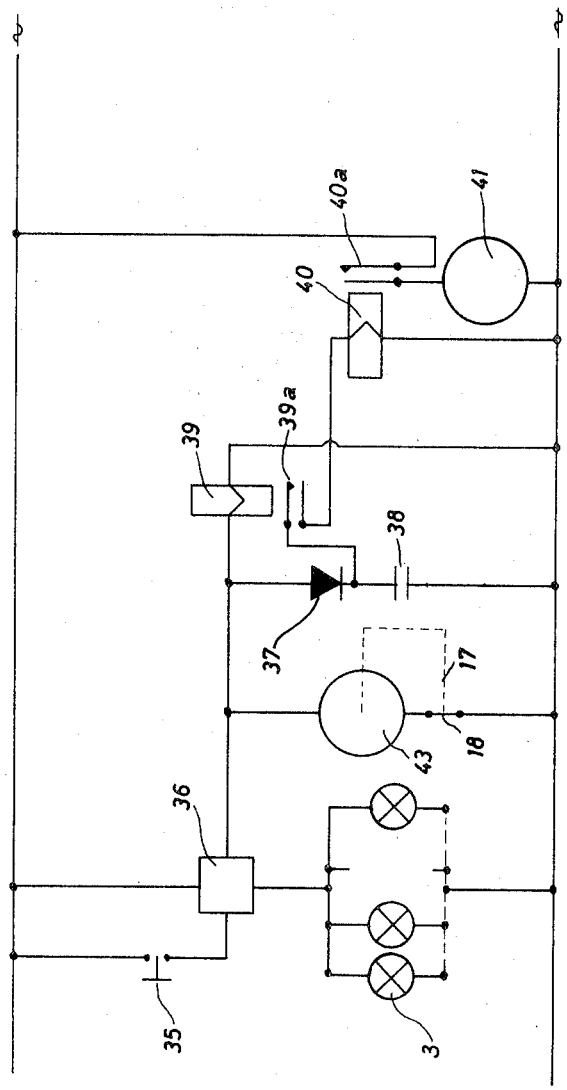
FIG. 5 illustrates a further embodiment of the present invention.

In a second embodiment of the invention both rollers are provided with a supplementary alternating current motor. The electric circuit for this embodiment is illustrated in FIG. 5. Occasionally, also two direct current motors may be provided which are mounted inside the rollers of the blind shutter.

By pressing the start button 35 the electric current actuates a switch device with time setting 36 which switches on the lamp set 3 during the set time. At the same time the motor 43 of the roller for unwinding the closure blind is rotating. A mechanical clutch or connection, e.g., screw 17 in FIG. 2, 17 causes the microswitch 18 to open at the moment the blind completely frees the lens opening, so that the motor is no longer energized and the blind maintains its assumed position. Simultaneously a capacitor 38 is charged through a rectifier 37. As the alternating current relay 39 is provided with a contact 39a which is opened upon the actuation of said relay, no discharge of the capacitor occurs. When the exposure time has ended the lamp set is switched off by the time switch 36, the alternating current relay 39 closes and the capacitor 38 can discharge through the direct current relay 40. In consequence thereof, the contact 40a is closing and the motor 41 controlling the roller for rewinding the blind is active for some time to make the shutter return into the closed position.

Figure 7:
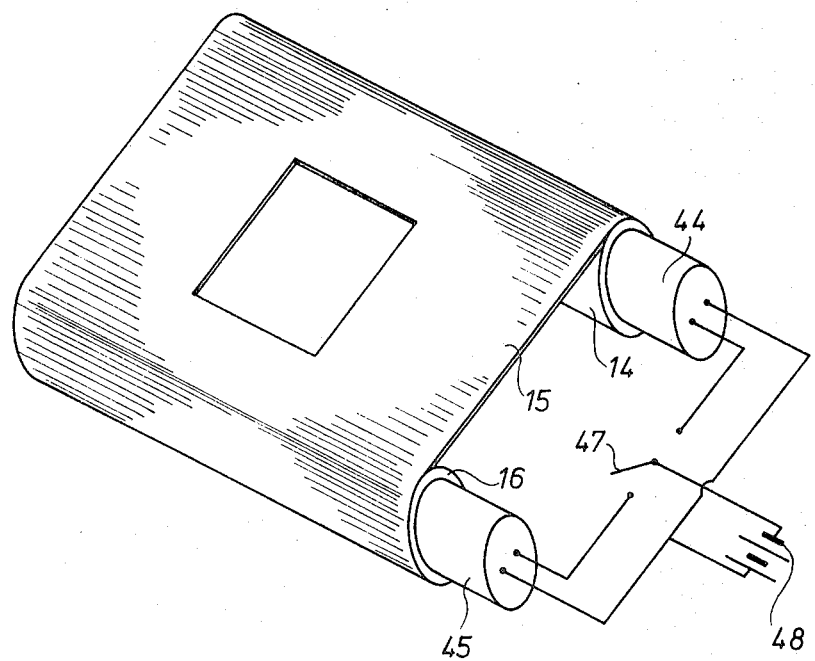

FIG. 7 illustrates schematically the use of two DC current motors 44 and 45 which are built into the rollers 14 and 16. These motors may be of the type operating with an external rotor closely fitting into the hollow rollers. Although a more or less analogous electrical wiring system as displayed in FIG. 5 may be used, e.g., by replacing the AC relays 39 and 40 by their DC analogues and the diode 37 by a resistor of appropriate value, easy regulation is obtained by sequentially energizing the two motors, one for opening and one for closing the closure 15. This may be achieved by providing a double pole switch 47 which connects a DC source 48 to either motor 45 fixedly joined with roller 16 to open the closure or to motor 44 for closing it.

We claim:

1. In a reprographic camera for exposing a sheet of photographic material to a sheet like original, and comprising
    a holder for positioning the sheet like original in the object plane of the camera,
    an optical projection system including a lens fitted to a plate, and a bellows, constituting a light-tight enclosure between said plate and the image plane of the camera, for projecting the image of the original into the image plane of the camera,
    a cassette arranged to contain a roll of photographic material and to unwind said material in sheet lengths and to position said sheets in the image plane of the camera, and
    light means for illuminating the holder supporting the original for exposing said material,
    the improvement which comprises a blind-like closure device for said lens, comprising a flexible blind having an exposure aperture therein suspended between two rollers, and capable of being wound up on each of said rollers, said closure device being disposed inside said bellows in proximity of the lens holding plate, an electric motor for driving said rollers, and electric current control means for controlling the rotation of said motor, said current control means comprising an alternating current circuit connected to said motor during starting and actuation of said closure to open position and a direct current circuit connected to said motor in lieu of said AC circuit to hold said closure in said open position.

2. Reprographic camera according to claim 1 wherein said motor is a self-starting synchronous motor.

3. Reprographic camera according to claim 1 wherein the amount of direct current passing through the motor during the open position of the closure is smaller than the RMS value of the alternating current during starting and movement of the closure.

4. Reprographic camera according to claim 3 in which the switching from said alternating current circuit to said direct current circuit is controlled by a switch which is activated by the movement of the closure into its open position.

* * * * *